(12) United States Patent
Brown et al.

(10) Patent No.: US 10,279,887 B2
(45) Date of Patent: May 7, 2019

(54) DECOMPRESSION PANEL ASSEMBLY AND METHODS OF ASSEMBLING THE SAME

(71) Applicant: The Boeing Company, Chicago, IL (US)

(72) Inventors: Douglas Alan Brown, Edmonds, WA (US); Adam Robert Weston, Brier, WA (US); Brian Tatsuo Imada, Everett, WA (US)

(73) Assignee: The Boeing Company, Chicago, IL (US)

( * ) Notice: Subject to any disclaimer, the term of this patent is extended or adjusted under 35 U.S.C. 154(b) by 275 days.

(21) Appl. No.: 15/174,154

(22) Filed: Jun. 6, 2016

(65) Prior Publication Data

US 2017/0349262 A1    Dec. 7, 2017

(51) Int. Cl.
| | | |
|---|---|---|
| *B64D 11/00* | (2006.01) | |
| *B64C 1/18* | (2006.01) | |
| *B64C 1/06* | (2006.01) | |
| *B64C 1/00* | (2006.01) | |

(52) U.S. Cl.
CPC ............... *B64C 1/18* (2013.01); *B64C 1/066* (2013.01); *B64C 2001/009* (2013.01); *Y02T 50/46* (2013.01)

(58) Field of Classification Search
CPC .............................................. B64C 2001/009
See application file for complete search history.

(56) References Cited

U.S. PATENT DOCUMENTS

| | | |
|---|---|---|
| 3,938,764 A | 2/1976 | McIntyre et al. |
| 5,085,017 A | 2/1992 | Hararat-Tehrani |
| 5,118,053 A | 6/1992 | Singh et al. |
| 5,606,829 A | 3/1997 | Hararat-Tehrani |
| 6,029,933 A | 2/2000 | Holman et al. |
| 6,129,312 A | 10/2000 | Weber |
| 6,264,141 B1 * | 7/2001 | Shim .................. B64C 1/18 244/118.5 |
| 8,393,577 B2 | 3/2013 | Roth et al. |

(Continued)

FOREIGN PATENT DOCUMENTS

EP      3170739 A1    5/2017

OTHER PUBLICATIONS

GB Examination Report for related application GB1708161.3 dated Sep. 5, 2018; 3 pp.

(Continued)

*Primary Examiner* — Richard G Davis
(74) *Attorney, Agent, or Firm* — Armstrong Teasdale LLP

(57) ABSTRACT

A decompression panel assembly for use in an aircraft includes a frame including a first surface and an opposing second surface, wherein the frame defines a grille opening and at least partially defines a flow path opening that are each defined between the first and second surfaces. The decompression panel assembly also includes a first panel and a second panel pivotally coupled together at a central hinge. A retention plate is releasably coupled to the first and second panels and is configured to move between a closed position and an open position. The first and second panels at least partially cover the grille opening in a planar position when the retention plate is in the closed position, and the first and second panels move away from the grille opening to a folded position when the retention plate is in the open position.

20 Claims, 16 Drawing Sheets

(56) References Cited

U.S. PATENT DOCUMENTS

| | | |
|---|---|---|
| 8,567,721 B2 | 10/2013 | Voss et al. |
| 8,651,924 B1 | 2/2014 | Jones et al. |
| 8,955,803 B2 | 2/2015 | Voss et al. |
| 9,499,251 B2 | 11/2016 | Perkins et al. |
| D817,851 S | 5/2018 | Perkins et al. |
| 2010/0320318 A1* | 12/2010 | Roth ................ B64C 1/066 244/118.5 |
| 2011/0139931 A1 | 6/2011 | Opp et al. |
| 2012/0043421 A1* | 2/2012 | Voss ................. B64C 1/18 244/118.5 |
| 2013/0320140 A1 | 12/2013 | Cheung et al. |
| 2015/0115103 A1 | 4/2015 | Perkins et al. |
| 2015/0225068 A1 | 8/2015 | Boyer et al. |

OTHER PUBLICATIONS

EP Combined Search and Examination Report for related application No. GB1708161.3, dated Nov. 17, 2017, 6 pages.

* cited by examiner

DECOMPRESSION PANEL ASSEMBLY AND METHODS OF ASSEMBLING THE SAME

BACKGROUND

The field of the present disclosure relates generally to aircraft assemblies and, more specifically, to sidewall panel assemblies for use in aircraft assemblies.

During a pressure change on an aircraft (such as a decompression event), air may flow from a passenger cabin to a cargo bay below the cabin through a cabin sidewall. Accordingly, the cabin sidewalls include decompression panels or decompression grills that restrict such airflow in standard operation and enable the airflow during a decompression event. Known decompression panels are solid panels and move to create an opening in the sidewall. At least some known decompression panels swing into the space between the sidewall and fuselage skin during a decompression event. However, to gain more cabin volume, the sidewalls may be positioned closer to the fuselage skin. In such a situation, the decompression panels do not have enough space to swing open (e.g., the panel will hit the fuselage skin or other structure behind the sidewall during a decompression event).

Known decompression grilles include an opening having louvers or have several openings through the grille. These openings allow air to flow through the grille during a decompression event so the grille does not move during the decompression event. A sound attenuating material (a.k.a., a baffle) is coupled to the backside of the grille opening(s) to decrease the noise in the cabin and can release from the grille during a decompression event. However, to allow for sufficient air return flow (as defined by regulations) through the sidewall, a portion of the opening is not covered by the baffle. Accordingly, sound waves can propagate through the grille at the uncovered portion and/or the louvers may generate sound as air flows past the louvers.

BRIEF DESCRIPTION

In one aspect, a decompression panel assembly for use in an aircraft is provided. The decompression panel assembly includes a frame including a first surface and an opposing second surface, wherein the frame defines a grille opening and at least partially defines a flow path opening that are each defined between the first and second surfaces. The decompression panel assembly also includes a first panel and a second panel pivotally coupled together at a central hinge. A retention plate is releasably coupled to the first and second panels and is configured to move between a closed position and an open position. The first and second panels at least partially cover the grille opening in a planar position when the retention plate is in the closed position, and the first and second panels move away from the grille opening to a folded position when the retention plate is in the open position.

In another aspect, a method of installing a decompression panel assembly in an aircraft is provided. The decompression panel assembly includes a body panel, a frame, a first panel, a second panel, and a retention plate. The method includes pivotally coupling the first panel to the frame at a first hinge, wherein the frame defines a grille opening and at least partially defines a flow path opening. The method also includes pivotally coupling the first panel to the second panel at a second hinge and releasably coupling the retention panel to the first and the second panels such that the retention panel is configured to move between a closed position and an open position. The first and second panels at least partially cover the grille opening in a planar position when the retention plate is in the closed position, and the first and second panels move away from the grille opening to a folded position when the retention plate is in the open position.

In yet another aspect, an aircraft is provided. The aircraft includes a sidewall assembly including a sidewall and a decompression panel assembly coupled to the sidewall. The decompression panel assembly includes a frame including a first surface and an opposing second surface, wherein the frame defines a grille opening and at least partially defines a flow path opening that are each defined between the first and second surfaces. The decompression panel assembly also includes a first panel and a second panel pivotally coupled together at a central hinge. A retention plate is releasably coupled to the first and second panels and is configured to move between a closed position and an open position. The first and second panels at least partially cover the grille opening in a planar position when the retention plate is in the closed position, and the first and second panels move away from the grille opening to a folded position when the retention plate is in the open position.

DETAILED DESCRIPTION

The embodiments illustrated herein describe a decompression panel assembly having a solid face panel that is retained against a frame during standard operating conditions and that moves away from the frame during a decompression event. In one implementation, the decompression panel assembly includes a frame having a first surface and an opposing second surface, wherein the frame defines a grille opening and at least partially defines a flow path opening. The decompression panel also includes a face panel having a first surface retained against the frame second surface such that the face panel at least partially covers the grille opening and a retention mechanism coupled to the face panel and configured to retain the face panel against the frame in a closed position. The decompression panel assembly also includes a containment device positioned adjacent a second surface of the face panel and configured to contain the face panel when the face panel is in an open position.

In another implementation, the decompression panel assembly includes a frame having a first surface and an opposing second surface, wherein the frame defines a grille opening and at least partially defines a flow path. The decompression panel assembly also includes a first panel and a second panel pivotally coupled together at a central hinge and a retention plate releasably coupled to the first and second panels and configured to move between a closed position and an open position. The first and second panels at least partially cover the grille opening in a planar position when the retention plate is in the closed position, and the first and second panels move away from the grille opening to a folded position when the retention plate is in the open position.

The decompression panel assembly implementations described herein have a number of advantages over conventional decompression panel assemblies. For example, the decompression panel assembly implementations described herein include a face panel that is positively retained against a frame of the assembly by either a plurality of retention mechanisms or by a retention plate. The positive retention devices both enable the face panel to move away from the frame to allow airflow through a grille opening during a decompression event. As described herein, the face panel is a solid member that completely covers the grille opening during standard operation and may not allow for any undesired air to pass through or for flapping or resonating of the face panel itself. As such, less noise is transmitted into the cabin. Additionally, described herein are a number of flow path openings to allow return air to flow through the decompression panel assembly during standard operation. The flow path openings described herein define a tortuous path around the frame that further attenuate noise transmitted into the cabin.

Figure 1:
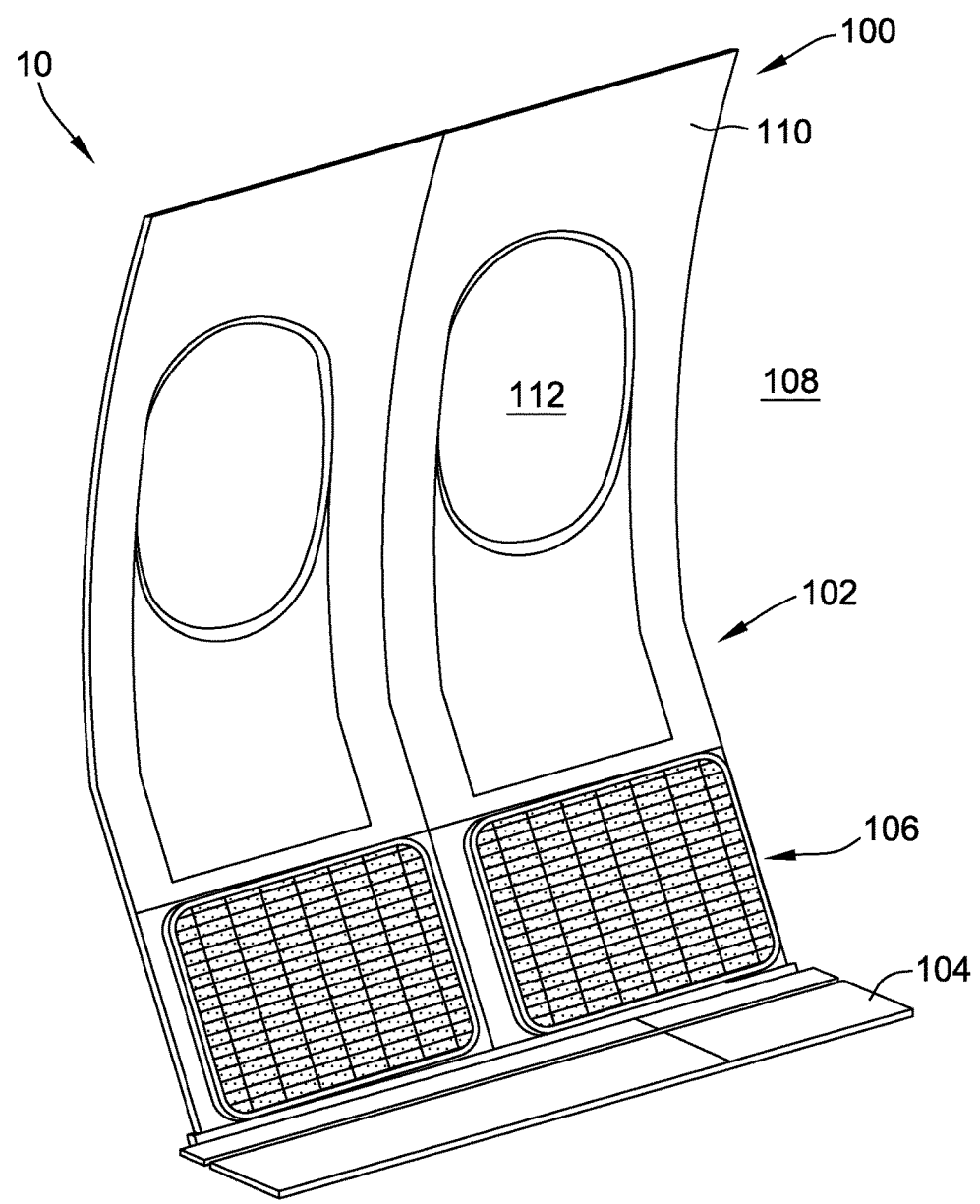
FIG. 1 is a perspective view of an inboard configuration of an exemplary aircraft cabin including an exemplary decompression panel assembly.

Referring to the drawings, FIG. 1 is a perspective sectional view of an exemplary cabin 100 that may be used with an aircraft 10. In the exemplary implementation, aircraft cabin 100 includes a sidewall assembly 102, a floor panel 104, and a decompression panel assembly 106 coupled therebetween. Sidewall assembly 102, floor panel 104, and decompression panel assembly 106 at least partially define an interior 108 of aircraft cabin 100. Sidewall assembly 102 includes a sidewall 110 having a window opening 112 defined therein. Alternatively, sidewall 110 does not include window opening 112. In operation, decompression panel assembly 106 facilitates circulating conditioned air through aircraft cabin 100 and/or facilitate equalizing the pressure in aircraft cabin 100 during a decompression event.

Figure 2:
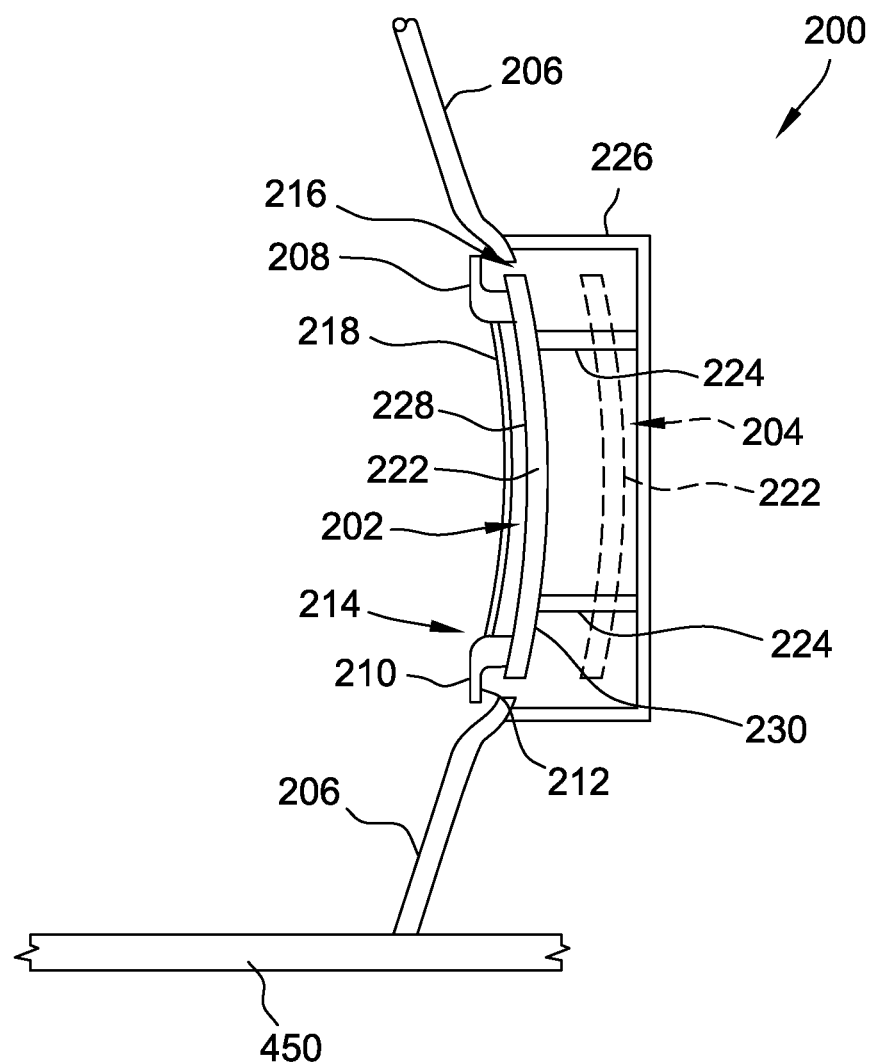
FIG. 2 is a cross-sectional side view of a first embodiment of the decompression panel assembly for use in the aircraft cabin shown in FIG. 1.
Figure 3:
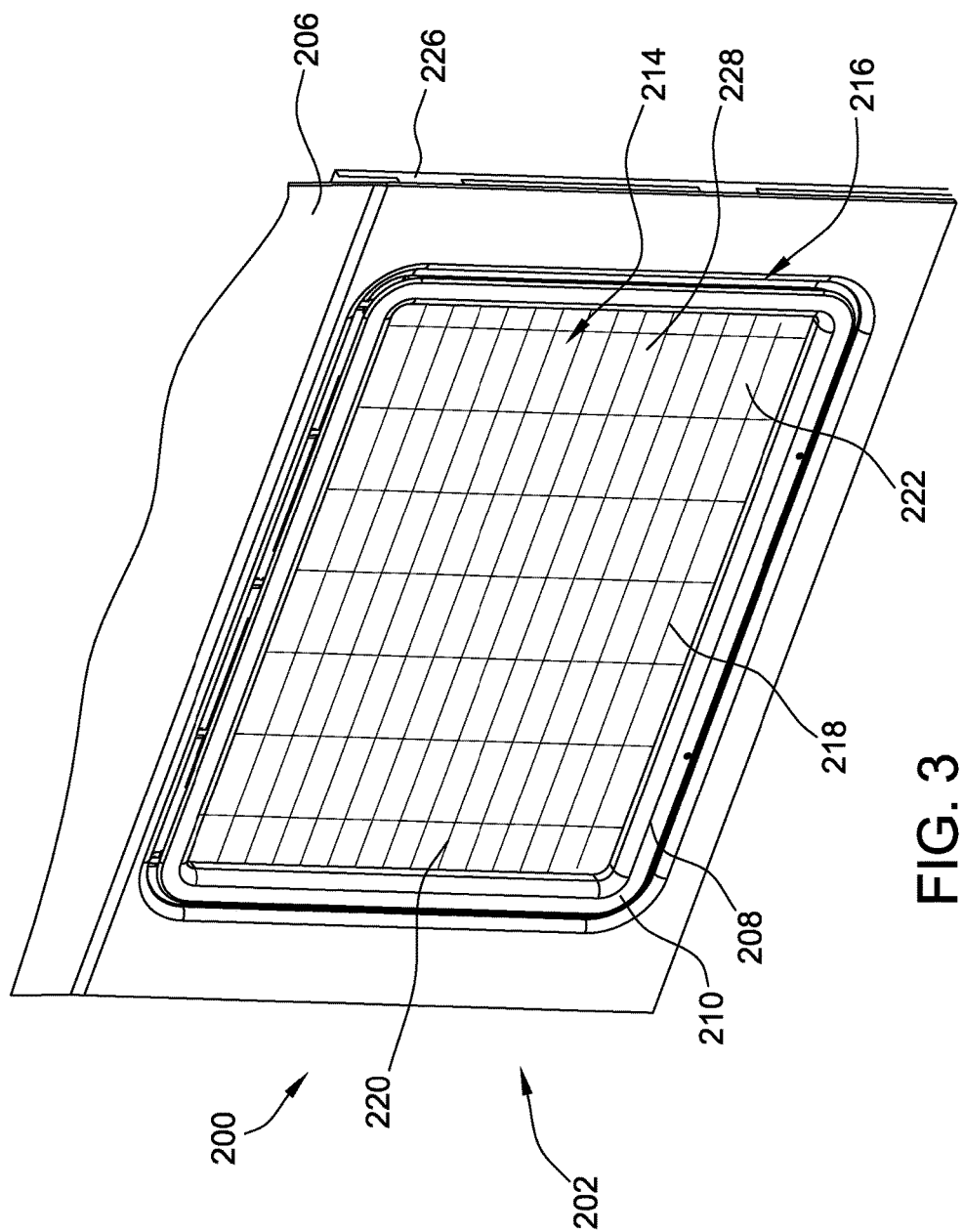
FIG. 3 is a perspective inboard view of the first embodiment of the decompression panel assembly in a closed position.
Figure 4:
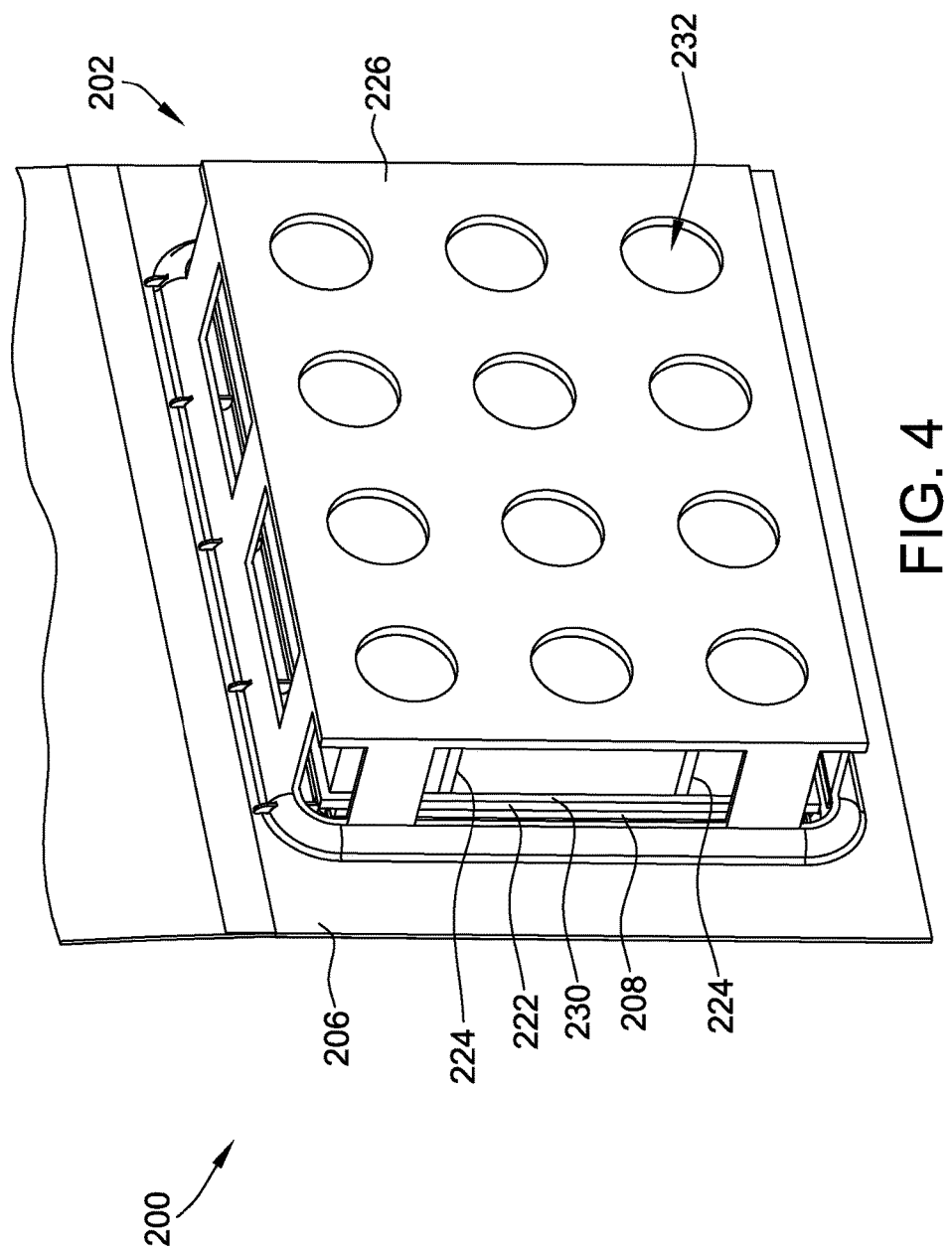
FIG. 4 is a perspective outboard view of the first embodiment of the decompression panel assembly in a closed position.
Figure 5:
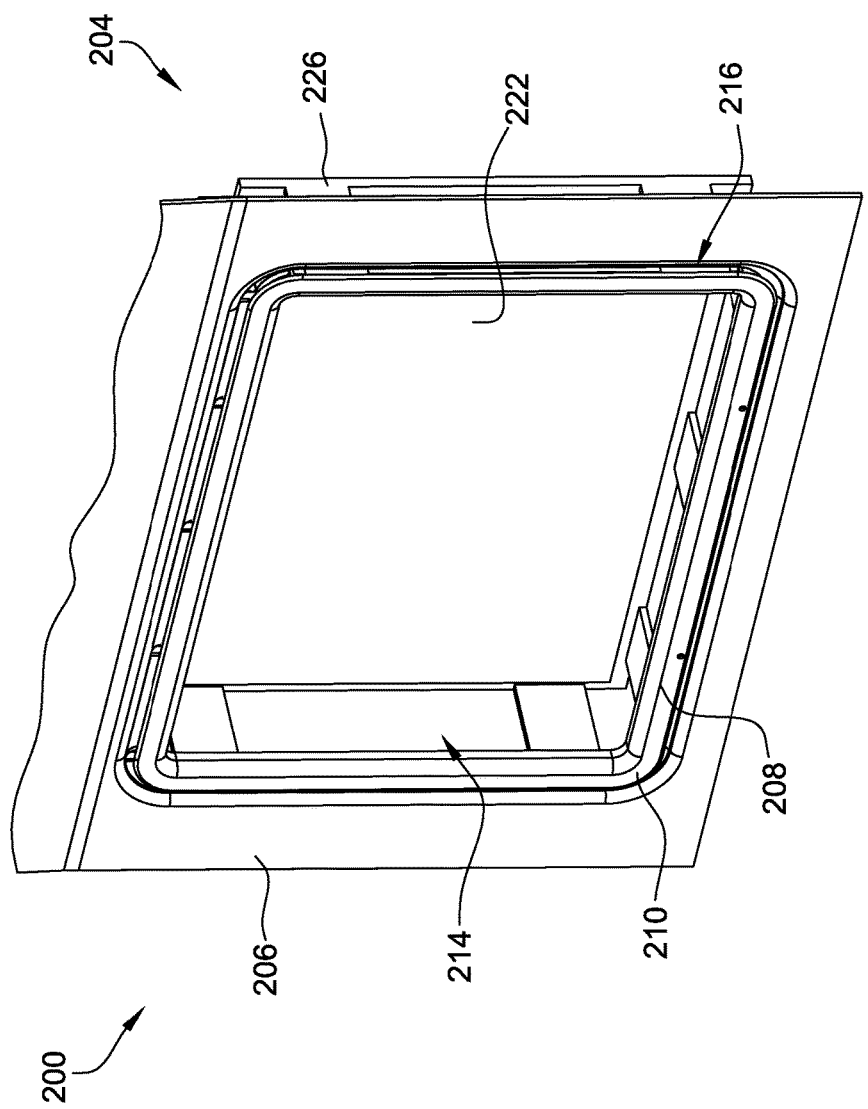
FIG. 5 is a perspective inboard view of the first embodiment of the decompression panel assembly in a deployed position.

FIG. 2 is a cross-sectional side view of a first embodiment of a decompression panel assembly 200 for use in aircraft cabin 100 (shown in FIG. 1). FIG. 3 is a perspective inboard view of decompression panel assembly 200 in a closed position 202, and FIG. 4 is a perspective outboard view of decompression panel assembly 200 also in the closed position 202. FIG. 5 is a perspective inboard view of decompression panel assembly 200 in an open or deployed position 204.

In the exemplary implementation, decompression panel assembly 200 includes a body panel 206 coupled between sidewall 110 (shown in FIG. 1) and floor panel 104. Decompression panel assembly 200 also includes a frame 208 including a first surface 210 and an opposing second surface 212. In the exemplary embodiment, frame 208 is coupled to body panel 206 and defines a grille opening 214 and at least partially defines a flow path opening 216 that are each defined between surfaces 210 and 212. More specifically, flow path opening 216 is defined about an entire perimeter of frame 208 between frame 208 and body panel 206 such that a return air flow is able to flow through decompression panel assembly 200 in standard pressurization operation. In one implementation, frame 208 is a separate component coupled to body panel 206. In another implementation, frame 208 is integrally formed with body panel 206, as described in further detail below. Decompression panel assembly 200 also includes a grille member 218 coupled to frame 208 such that grille member 218 spans grille opening 214. Grille member 218 includes a plurality of frame members or louvers 220 that define a plurality of openings in grille member 218.

In the exemplary implementation, decompression panel assembly 200 also includes a face panel 222, and at least one retention mechanism 224. Decompression panel assembly 200 may also include a containment device 226. Face panel 222 includes a first surface 228 that faces toward frame 208 and a second surface 230 that faces toward containment device 226. Retention mechanism 224 is coupled to face panel 222 and containment device 226 and is configured to retain face panel 222 against frame 208 when face panel 222 is in a closed position, as described below. Containment device 226 is coupled to at least one of frame 208 and body panel 206 and is positioned adjacent second surface 230 of face panel such that containment device 226 contains face panel 222 when face panel 222 is in an open position as described below. Furthermore, containment device 226 includes a plurality of weight reduction features 232, such as openings, to reduce the overall weight of containment device 226.

In operation, face panel 222 is configured for at least partial displacement from frame 208 during a decompression event to enable air flow through grille opening 214 between louvers 220. As shown in FIGS. 3 and 4, during standard pressurization operations, when face panel 222 is in the closed position 202, retention mechanism 224 contacts second surface 230 of face panel 222 to retain first surface 228 of face panel 222 against second surface 212 frame 208 such that face panel 222 at least partially covers grille opening 214.

During a decompression event, air flows through the grille opening 214 and forces face panel 222 outward into the open position 204 such that first surface 228 is spaced apart from frame 208 to allow air to flow through grille opening 214, as shown in FIG. 5. Grille member 218 is not shown in FIG. 5 for clarity. The force from the air flow overcomes the predetermined retention forces of retention mechanism 224 that hold face panel 222 against frame 208 such that face panel 222 moves away from frame 208 and is retained by containment device 228. More specifically, retention mechanism 224 is configured to allow face panel 222 to move from the closed position 202 to the open position 204 when face panel 222 is subjected to a predetermined pressure differential during a decompression event.

In one implementation, retention mechanism 224 includes a spring member that biases face panel 222 toward frame 208 such that first surface 228 of face panel 222 contacts second surface 212 of frame 208. As described herein, during a decompression event, the spring force of retention mechanism 224 is designed to be overcome by the differential pressure such that retention mechanism 224 moves face panel 222 from the closed position 202 to the open position 204 to allow air to flow through grille opening 214. Following a decompression event, the pressure differential decreases such that the spring member of retention mechanism 224 biases face panel 222 from the open position 204 to the closed position 202.

In another implementation, retention mechanism 224 includes at least one frangible member that is configured to fracture when face panel 222 is subjected to a predetermined pressure differential during a decompression event. More specifically, such a frangible member is designed to include a point of weakness that fractures when subjected to a predetermined pressure differential such that face panel 222 moves from the closed position 202 to the open position 204 to allow air to flow through grille opening 214 when face panel 222 is held to frame 208.

Figure 6:
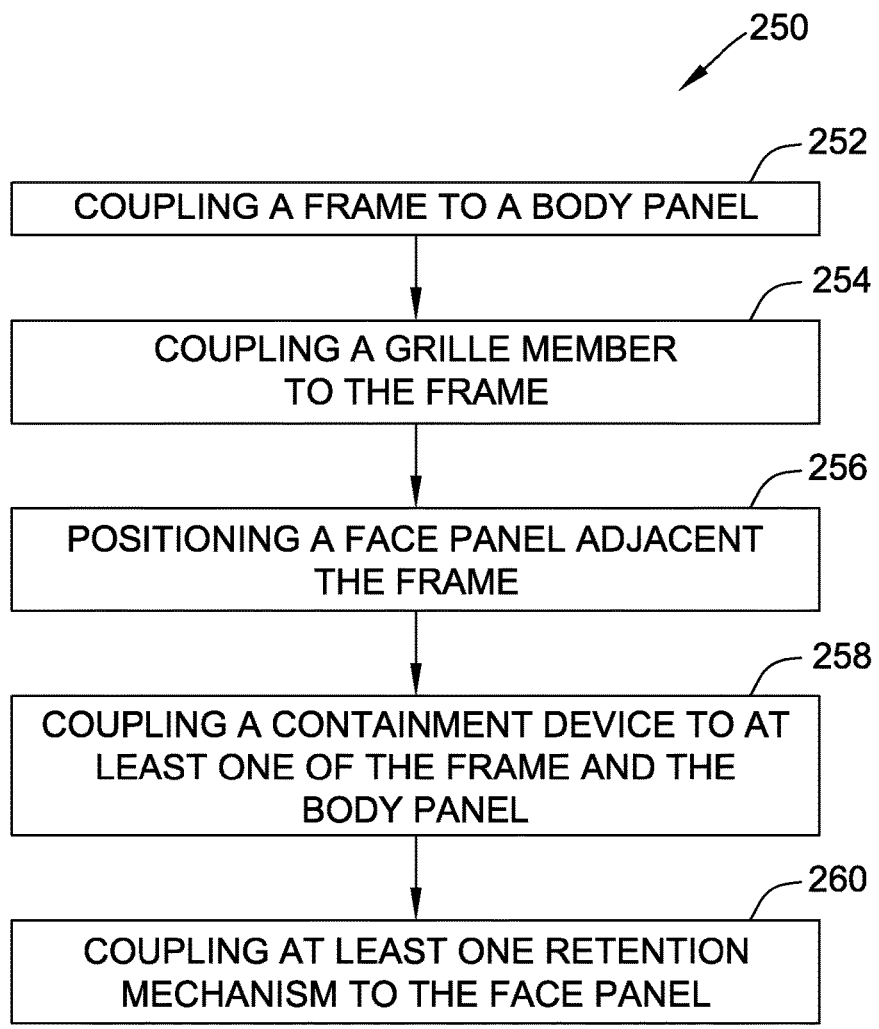
FIG. 6 is a flow chart of a method of installing the decompression panel assembly.

FIG. 6 is a flow chart of a method 250 of installing decompression panel assembly 200 in aircraft 10. Method 250 includes coupling 252 frame 208 to body panel 206. As described above, in one implementation, frame 208 and body panel 206 are separate components coupled together. In another implementation frame 208 and body panel 206 are integrally formed and such coupling 252 is performed during initial fabrication of decompression panel assembly 200. Furthermore, method 250 includes coupling 254 grille member 218 to frame 208 such that grille member 218 spans grille opening 214 and such that flow path opening 216 is defined between frame 208 and grille member 218. Method 250 further includes positioning 256 face panel 222 adjacent frame 208 such that first surface 228 of face panel 222 is retained against frame second surface 212 such that face panel 222 at least partially covers grille opening 214. Containment device 226 may be coupled 258 to at least one of frame 208 and body panel 206 such that containment device 226 is positioned adjacent second surface 230 of face panel 222 to allow containment device 226 to contain face panel 222 when face panel 222 is in the open position 204. Furthermore, method 250 includes coupling 260 at least one retention mechanism 224 to face panel 222 such that retention mechanism 224 retains face panel 222 against frame 208 in the closed position 202.

Figure 7:
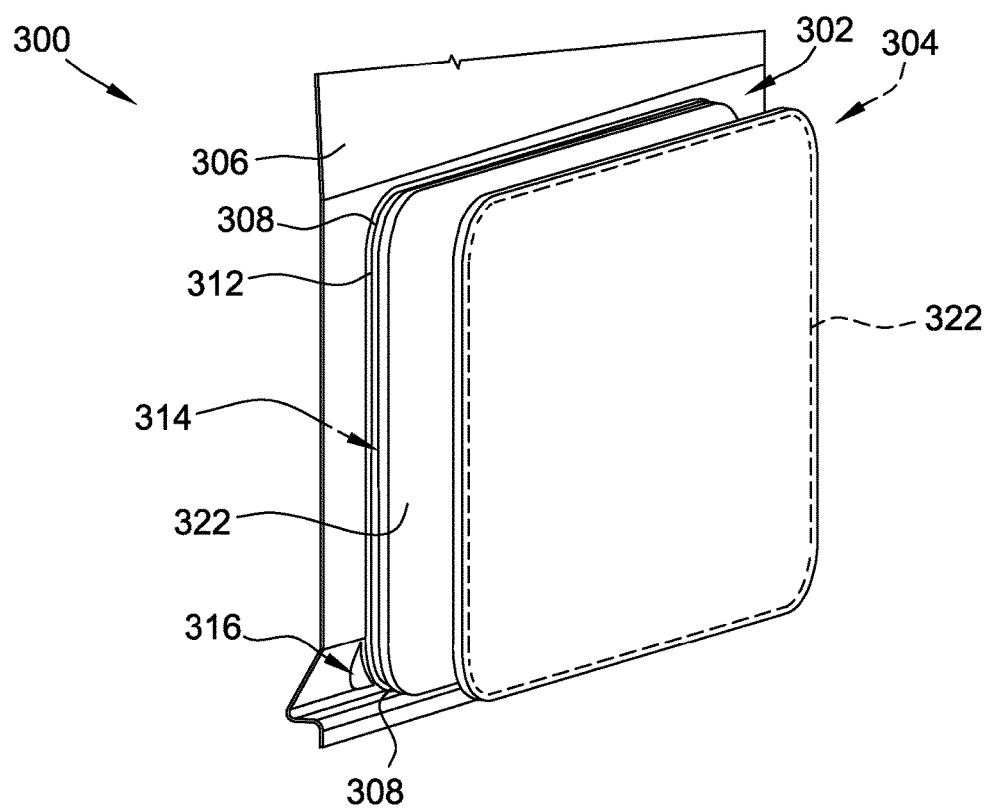
FIG. 7 is a perspective outboard view of a second embodiment of the decompression panel assembly.

FIG. 7 is a perspective outboard view of an alternative decompression panel assembly 300 for use in aircraft cabin 100 (shown in FIG. 1). Decompression panel assembly 300 is substantially similar to decompression panel assembly 200 and also includes a face panel 322 that is moveable between a closed position 302 and an open position 304. Decompression panel assembly 300 includes a containment device, retention mechanism, and grille member similar to containment device 226, retention mechanism, and grille member 218 in decompression panel assembly 200, but are not shown in FIG. 7 for clarity. Decompression panel assembly 300 includes a body panel 306 coupled between sidewall 110 (shown in FIG. 1) and floor panel 104 (shown in FIG. 1). Decompression panel assembly 300 also includes a frame 308 including a first surface (not shown) and an opposing second surface 312. In the exemplary embodiment, frame 308 is coupled to body panel 306 and defines a grille opening 314 and at least partially defines a flow path opening 316.

As shown in FIG. 7, flow path opening 316 is defined about only a portion of a perimeter of frame 308 between frame 308 and body panel 306 such that a return air flow is able to flow through decompression panel assembly 300 in standard pressurization operation. More specifically, flow path opening 316 is defined between a rear surface 318 of panel 306 and the first surface of frame 308. In one implementation, frame 308 is a separate component coupled to body panel 206. In another implementation, frame 308 is integrally formed with body panel 306, as described in further detail below.

Figure 8:
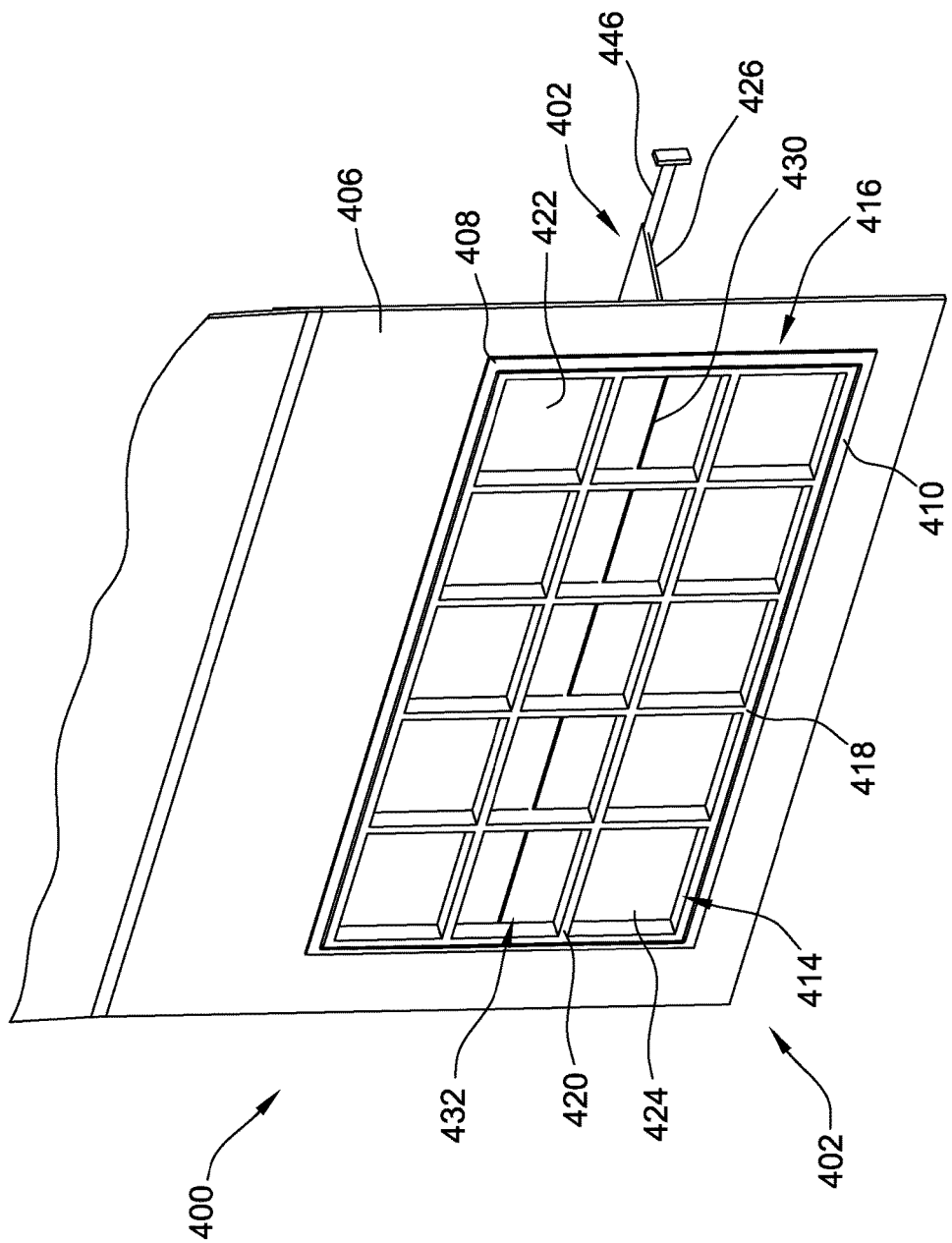
FIG. 8 is a perspective inboard view of a third embodiment of the decompression panel assembly in a closed position.
Figure 9:
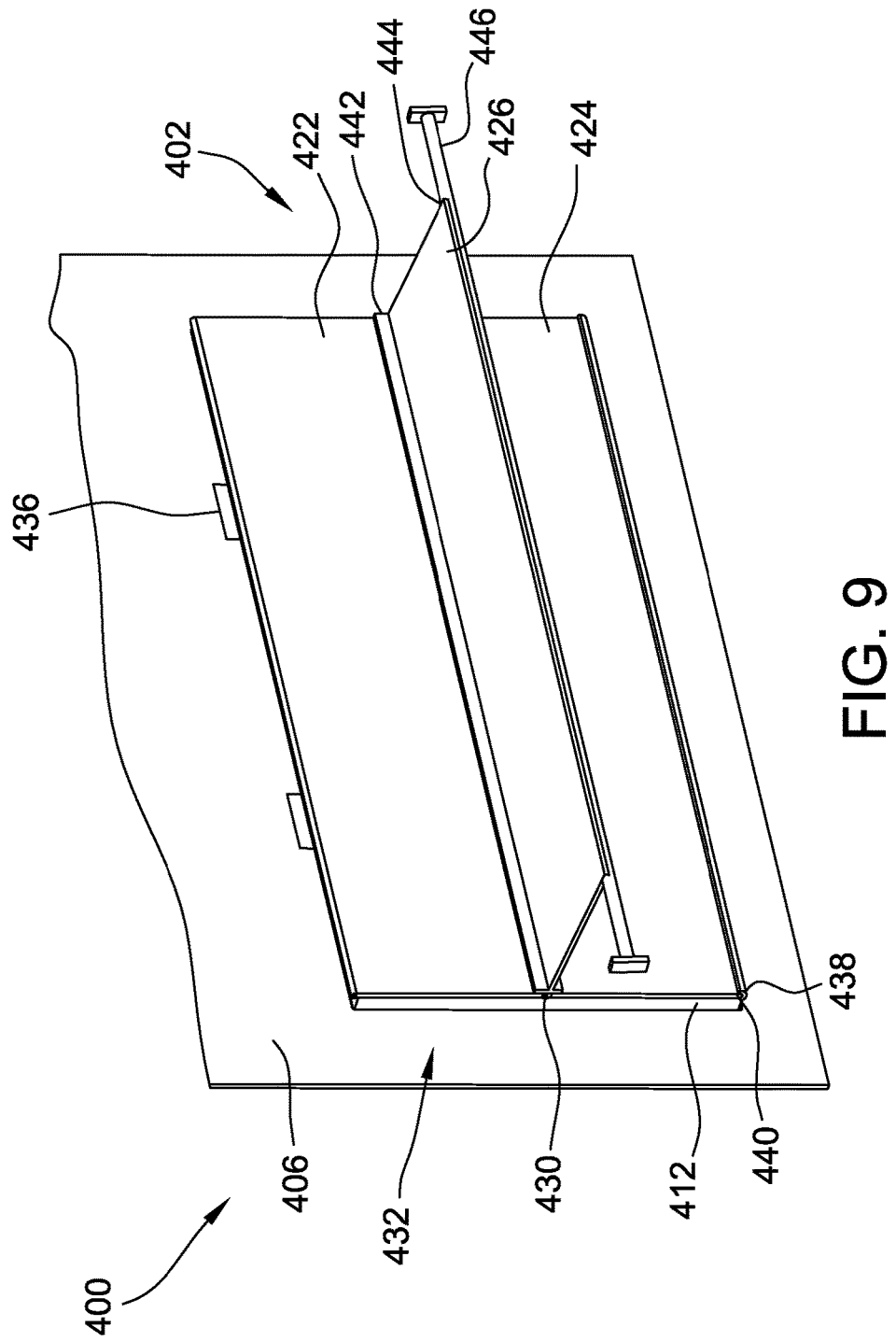
FIG. 9 is a perspective outboard view of the third embodiment of the decompression panel assembly in a closed position.
Figure 10:
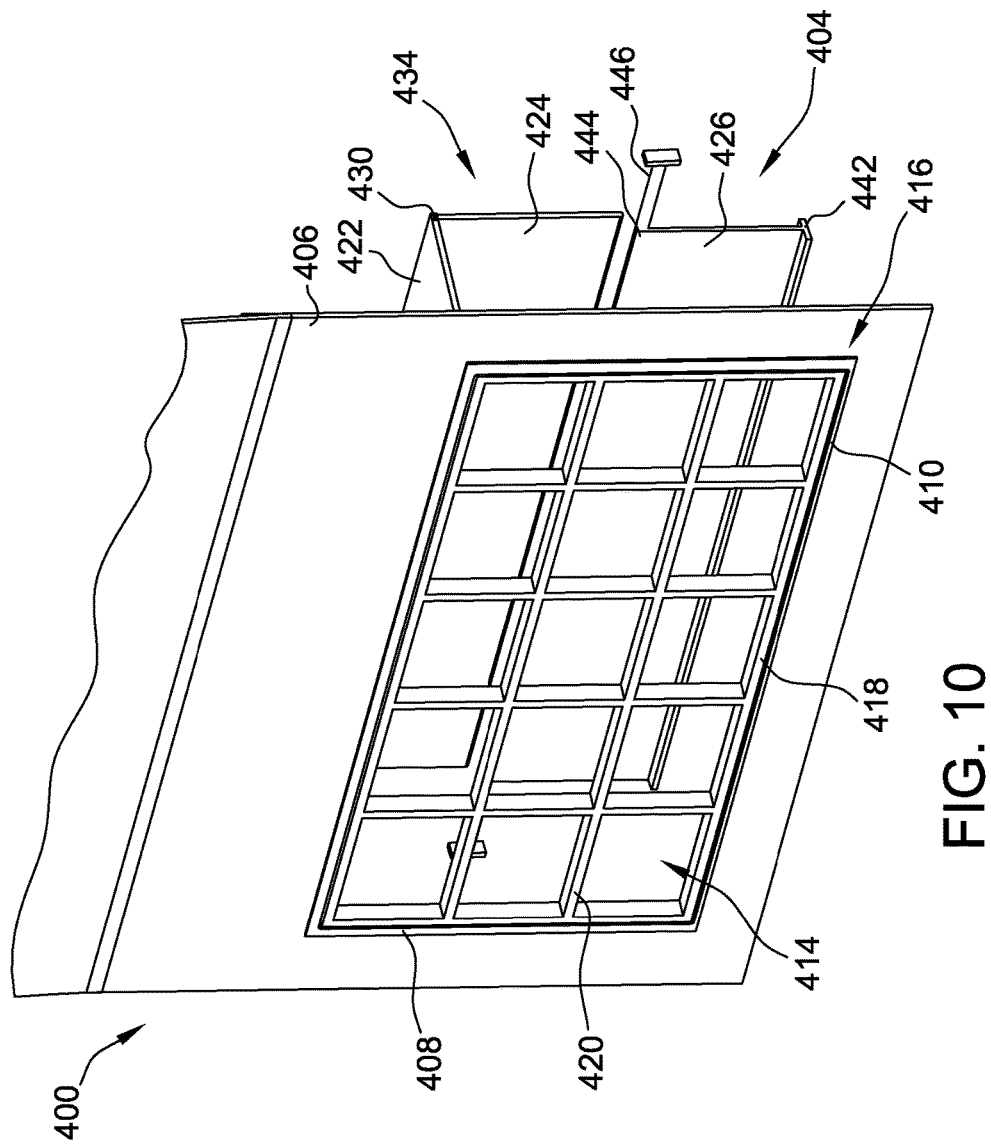
FIG. 10 is a perspective inboard view of the third embodiment of the decompression panel assembly in a deployed position.

FIG. 8 is a perspective inboard view of another implementation of a decompression panel assembly 400 in a closed position 402 for use in aircraft cabin 100 (shown in FIG. 1). FIG. 9 is a perspective outboard view of decompression panel assembly 400 in the closed position 402, and FIG. 10 is a perspective inboard view of decompression panel assembly 400 in an open or deployed position 404.

In the exemplary implementation, decompression panel assembly 400 includes a body panel 406 coupled between sidewall 110 and floor panel 104 (both shown in FIG. 1). Decompression panel assembly 400 also includes a frame 408 including a first surface 410 and an opposing second surface 412 (shown in FIG. 9). In the exemplary embodiment, frame 408 is coupled to body panel 406 and defines a grille opening 414 and at least partially defines a flow path opening 416 that are each defined between surfaces 410 and 412. More specifically, flow path opening 416 is defined about an entire perimeter of frame 408 between frame 408 and body panel 406 such that a return air flow is able to flow through decompression panel assembly 400 in standard pressurization operation. In one implementation, frame 408 is a separate component coupled to body panel 406. In another implementation, frame 408 is integrally formed with body panel 406, as described in further detail below. Decompression panel assembly 400 also includes a grille member 418 coupled to frame 408 such that grille member 418 spans grille opening 414. Grille member 418 includes a plurality of frame members or louvers 420 that define a plurality of openings in grille member 418.

In the exemplary implementation, decompression panel assembly 400 also includes a first face panel 422, a second face panel 424, and a retention plate 426. First face panel 422 is pivotally coupled to second face panel 424 at a central hinge 430 (also referred to as a second hinge) such that face panels 422 and 424 are moveable between a planar position 432, as shown in FIGS. 8 and 9, and a folded position 434, as shown in FIG. 10. As described herein, in the planar position 432, panels 422 and 424 are retained against frame 408 such that panels 42 and 424 at least partially cover grille opening 414 to prevent or reduce airflow through opening 414. In the folded position 434, panels 422 and 424 are pivoted away from frame 408 to enable airflow through grille opening 414. Decompression panel assembly 400 includes a top hinge 436 (also referred to as a first hinge) coupled to frame 408 and to first face panel 422 for facilitating movement of first face panel 422 between the planar position 432 and the folded position 434. Furthermore, frame 408 also includes a channel 438 for retaining a bottom edge 440 of second face panel 424 when face panels 422 and 424 are in the planar position 432.

In the exemplary implementation, retention plate 426 includes a first side 442 and an opposing second side 444. First side 442 is positioned proximate face panels 422 and 424 when retention plate 426 is in the closed position 402, and second side 444 is pivotally coupled to a pivot bar 446 that extends between adjacent structures (not shown). Pivot bar 446 facilitates movement of retention plate 426 during a decompression event, as will be explained in more detail below.

In operation, face panels 422 and 424 are configured for at least partial displacement from frame 408 during a decompression event to enable air flow through grille opening 414 between louvers 420. As shown in FIGS. 8 and 9, during standard pressurization operations, when face panels 422 and 424 are in the planar position 432, retention plate first side 442 is releasably coupled to first and second face panels 422 and 424 at central hinge 430 such that first side 442 biases first and second face panels 422 and 424 in the planar position 432 when retention plate 426 is in the closed position 402. Accordingly, face panels 422 and 424 are retained against second surface 412 of frame 408 such that face panels 422 and 424 at least partially cover grille opening 414.

During a decompression event, face panels 422 and 424 and retention plate 426 are subjected to a differential pressure, which causes retention plate 426 to move to the open position 404 and face panels 422 and 424 to move to the folded position 434. More specifically, when subjected to a predetermined pressure differential, retention plate 426 pivots about second side 444 from the closed position 402 to the open position 404. As such, first side 442 releases from central hinge 430 and allows first and second face panels 422 and 424 to move from the planar position 432 to the folded position 434. In the exemplary implementation, central hinge 430 biases first and second face panels 422 and 424 into the folded position 434 when retention plate 426 is in the open position 404. Accordingly, as described herein, retention plate 426 is releasably coupled to first and second face panels 422 and 424 and is configured to move between the closed position 402 and the open position 404. First and second face panels 422 and 424 at least partially cover grille opening 414 in the planar position 432 when retention plate 426 is in the closed position 402. First and second face panels 422 and 424 move away from grille opening 414 to the folded position 434 when retention plate 426 is in the open position 404.

Figure 11:
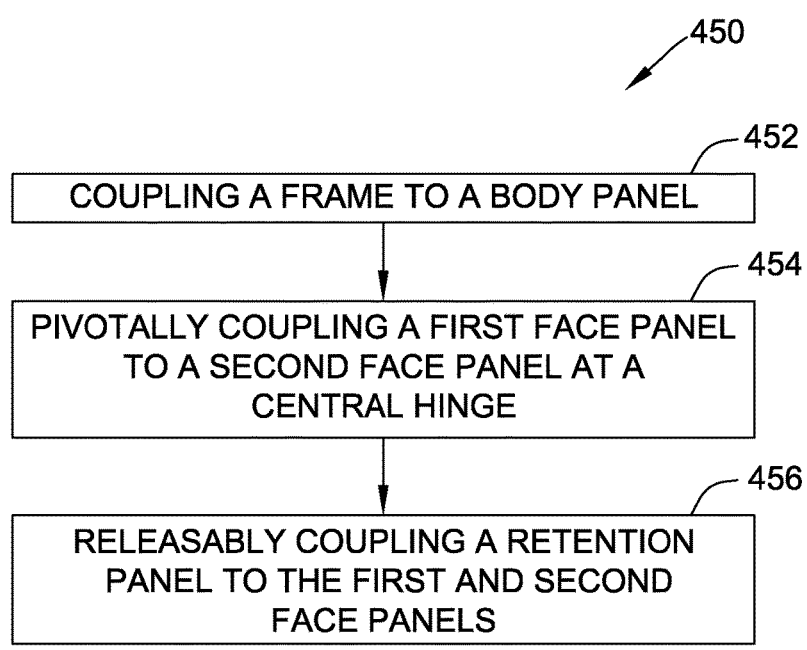
FIG. 11 is a flow chart of a method of installing the decompression panel assembly.

FIG. 11 is a flow chart of a method 450 of installing decompression panel assembly 400 in aircraft 10. Method 450 includes coupling 452 frame 408 to body panel 406. As described above, in one implementation, frame 408 and body panel 406 are separate components coupled together. In another implementation frame 408 and body panel 406 are integrally formed and such coupling 452 is performed during initial fabrication of decompression panel assembly 400. Furthermore, method 450 includes coupling 454 first face panel 422 to frame 408 at top hinge 436. Method 450 further includes coupling 454 first face panel 422 to second face panel 424 at central hinge 430 and then releasably coupling 456 retention plate 426 to first and second face panels 422 and 424. Retention plate 426 is configured to move between the closed position 402 and the open position 404. First and second face panels 422 and 424 at least partially cover grille opening 414 in the planar position 432 when retention plate 426 is in the closed position 402. First and second face panels 422 and 424 move away from grille opening 414 to the folded position 434 when retention plate 426 is in the open position 404.

Figure 12:
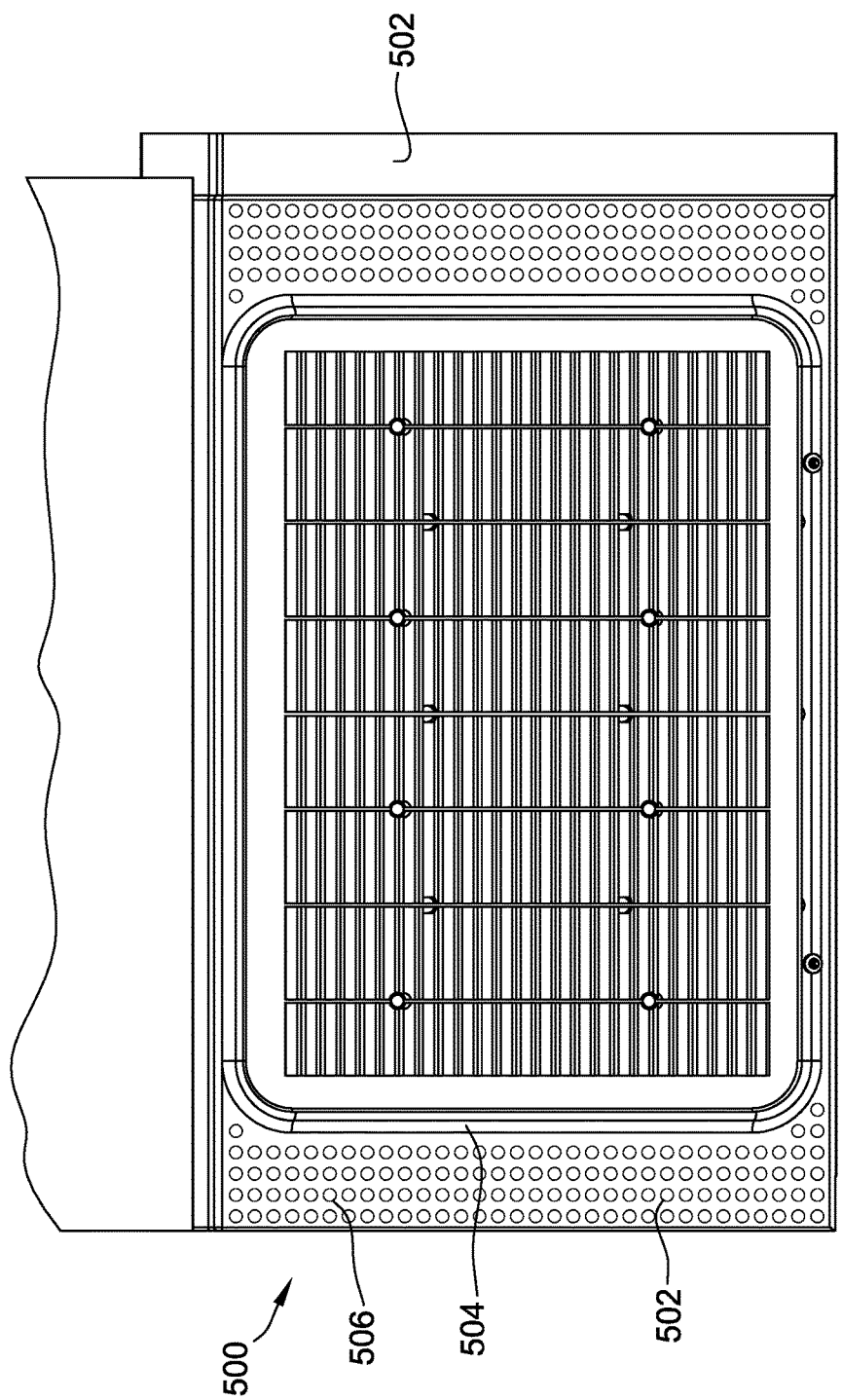
FIG. 12 is a perspective view of a first return air configuration that may be used with the decompression panel assembly shown in FIGS. 3-10.

FIG. 12 is a perspective view of a first return air configuration 500 that may be used with any of decompression panel assembly 200, 300, or 400. Configuration 500 includes a body panel 502 and a frame 504 coupled to body panel 502. Body panel 502 is substantially similar to any of body panels 206, 306, and 406. Similarly, frame 504 is substantially similar to any of frames 208, 308, and 408. As shown in FIG. 12, body panel 502 includes a plurality of openings 506 defined therethrough. Openings 506 enable a predetermined amount of air to flow through body panel 502 and may be used in combination with or in place of flow path openings 216, 316, and 416. Although openings 506 are shown in FIG. 12 as equally sized and uniformly spaced in body panel 502, openings 506 may include different sizes and spacing configurations to satisfy various design requirements.

Figure 13:
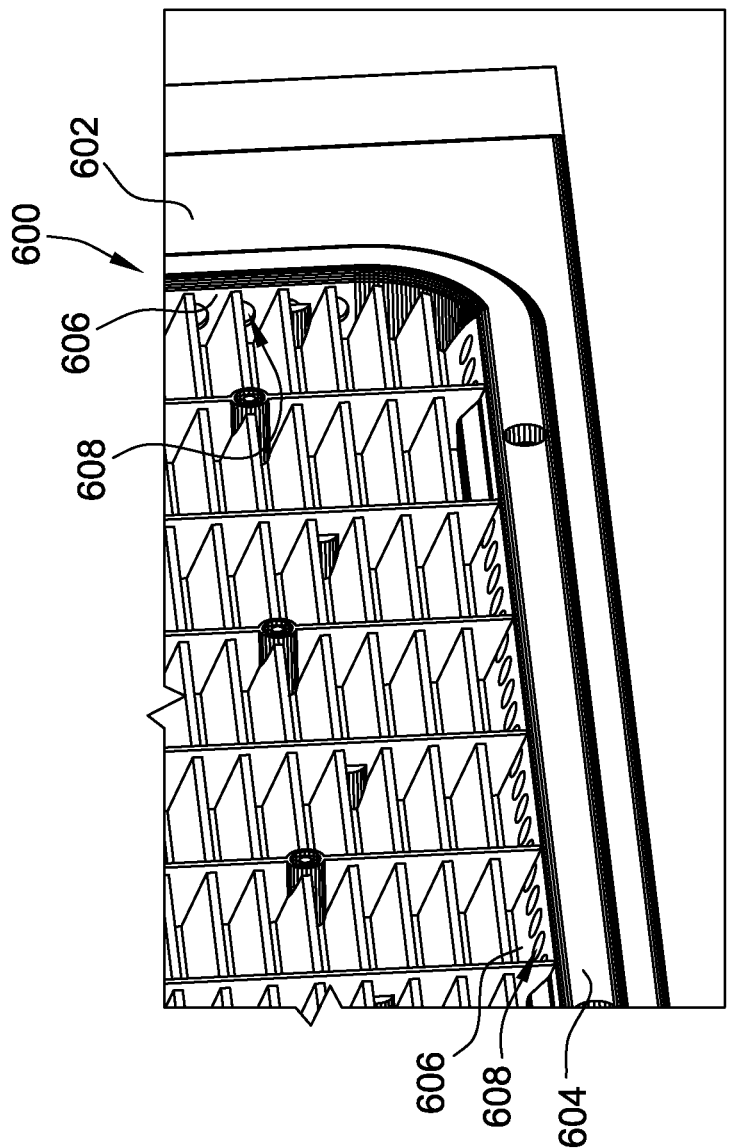
FIG. 13 is a perspective view of a second return air configuration that may be used with the decompression panel assembly shown in FIGS. 3-10.

FIG. 13 is a perspective view of a second return air configuration 600 that may be used with any of decompression panel assembly 200, 300, or 400. Configuration 600 includes a body panel 602 and a frame 604 coupled to body panel 602. Body panel 602 is substantially similar to any of body panels 206, 306, and 406. Similarly, frame 604 is substantially similar to any of frames 208, 308, and 408. As shown in FIG. 12, frame 602 includes a plurality of sidewalls 606 that each include a plurality of openings 608 defined therethrough. Openings 608 enable a predetermined amount of air to flow through frame 604, but around any of panels 222, 322, 422, and 424, and may be used in combination with or in place of flow path openings 216, 316, and 416. Although openings 608 are shown in FIG. 13 as equally sized and uniformly spaced in frame 604, openings 608 may include different sizes and spacing configurations to satisfy various design requirements.

Figure 14:
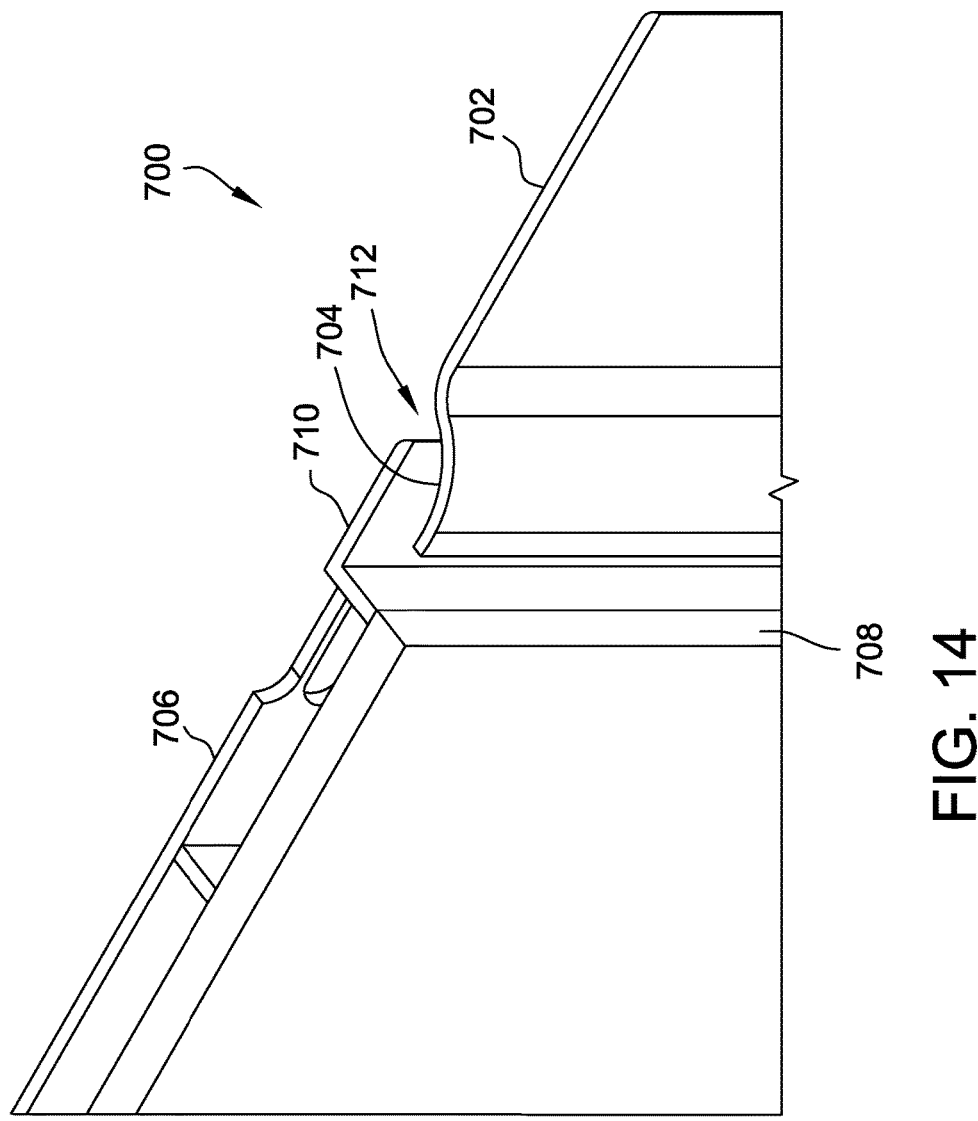
FIG. 14 is a perspective view of a third return air configuration that may be used with the decompression panel assembly shown in FIGS. 3-10.

FIG. 14 is a perspective view of a third return air configuration 700 that may be used with any of decompression panel assembly 200, 300, or 400. Configuration 700 includes a body panel 702 and a frame 704 coupled to body panel 702. As shown in FIG. 14, body panel 702 and frame 704 are integrally formed. In another implementation, body panel 702 and frame 704 are separate components coupled together. Configuration 700 also includes a grille member 706 coupled to frame 704 and a face panel 708 coupled to at least one of grille member 706 and frame 704. Grille member 706 includes an extension panel 710 spaced away from frame 704 a distance such that a flow path opening 712 is defined between extension panel 710 and frame 704. As shown in FIG. 14, flow path opening 712 defines a tortuous path through configuration 700, which increases noise attenuation into cabin 100 (shown in FIG. 1) and also reduces foreign object intake through configuration 700.

Figure 15:
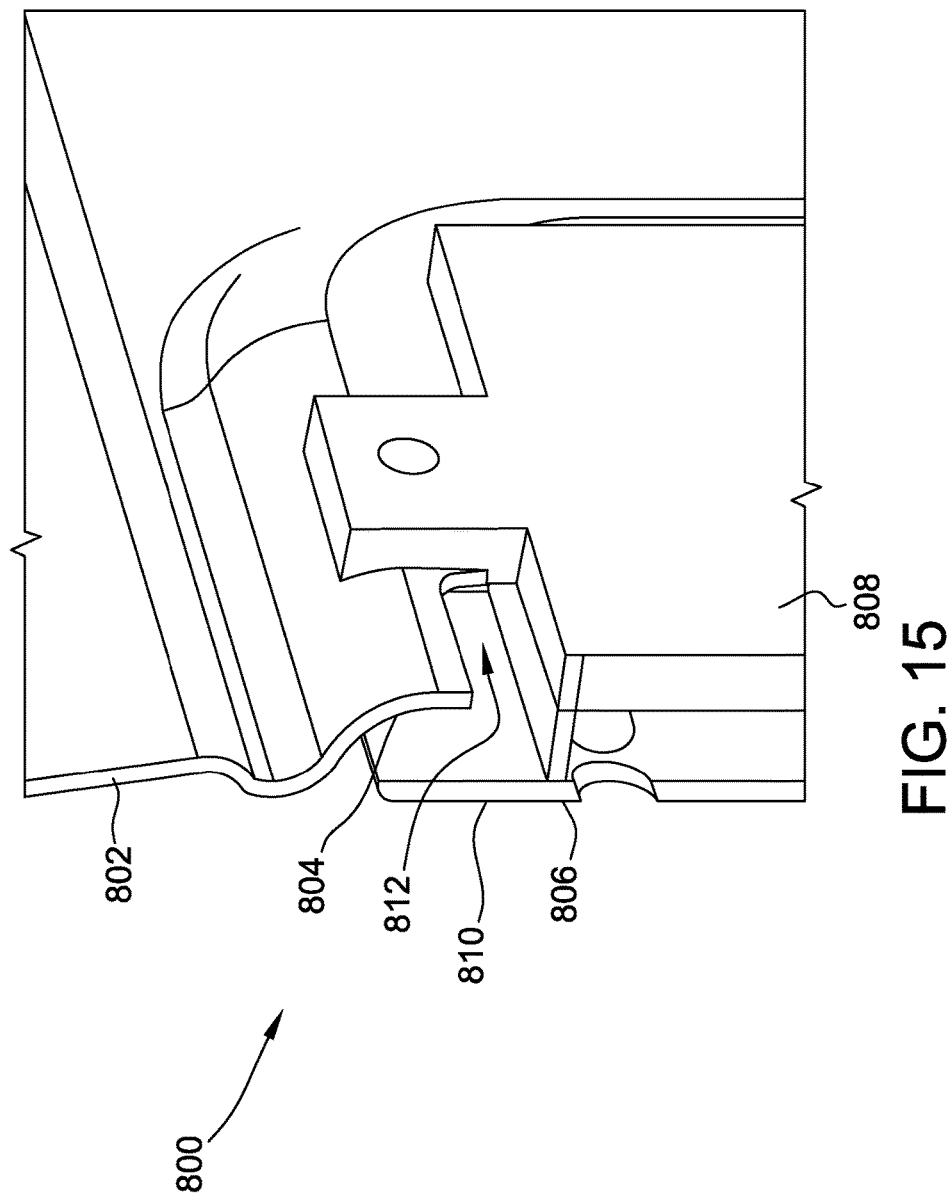
FIG. 15 is a perspective view of a fourth return air configuration that may be used with the decompression panel assembly shown in FIGS. 3-10.

FIG. 15 is a perspective view of a fourth return air configuration 800 that may be used with any of decompression panel assembly 200, 300, or 400. Configuration 800 includes a body panel 802 and a frame 804 coupled to body panel 802. As shown in FIG. 15, body panel 802 and frame 804 are integrally formed. In another implementation, body panel 802 and frame 804 are separate components coupled together. Configuration 800 also includes a grille member 806 coupled to frame 804 and a face panel 808 coupled to at least one of grille member 806 and frame 804. Grille member 806 includes an extension panel 810 spaced away from frame 804 a distance such that a flow path opening 812 is defined between extension panel 810 and frame 804. As shown in FIG. 15, flow path opening 812 defines a tortuous path through configuration 800, which increases attenuation of noise into cabin 100 (shown in FIG. 1) and also reduces foreign object intake through configuration 800. Configuration 800 is similar to configuration 700, except configuration 800 could be used at a top of the grille member and configuration 700 could be used along the sides of the grille member.

Figure 16:
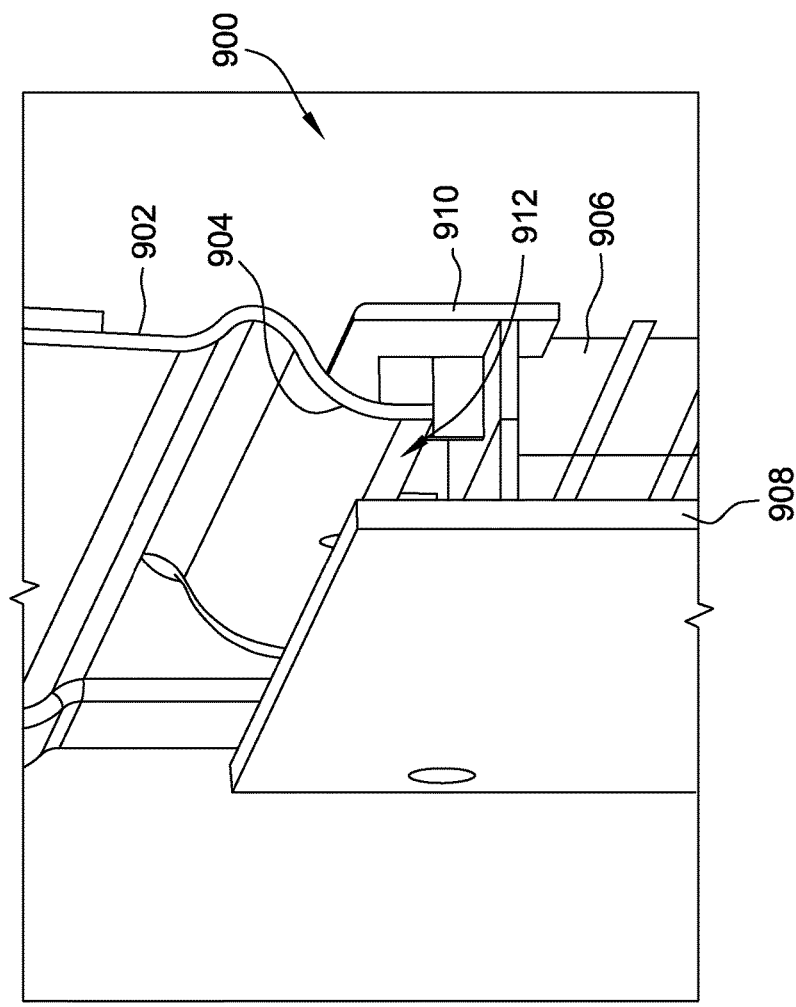
FIG. 16 is a perspective view of a fifth return air configuration that may be used with the decompression panel assembly shown in FIGS. 3-10.

FIG. 16 is a perspective view of a fifth return air configuration 900 that may be used with any of decompression panel assembly 200, 300, or 400. Configuration 900 includes a body panel 902 and a frame 904 coupled to body panel 902. As shown in FIG. 16, body panel 902 and frame 904 are integrally formed. In another implementation, body panel 902 and frame 904 are separate components coupled together. Configuration 900 also includes a grille member 906 coupled to frame 904 and a face panel 908 coupled to at least one of grille member 906 and frame 904. Grille member 906 includes an extension panel 910 spaced away from frame 904 a distance such that a flow path opening 912 is defined between extension panel 910 and frame 904. As shown in FIG. 16, flow path opening 912 defines a tortuous path through configuration 900, which increases noise attenuation into cabin 100 (shown in FIG. 1) and also reduces foreign object intake through configuration 900. Configuration 900 is similar to configurations 700 and 800, except configuration 900 causes a double bend in the flow path through the flow path opening and configurations 700 and 800 cause a single bend in the flow path through the flow path opening. In addition, any of the features of the configurations shown in FIGS. 12-16 may be combined with each other.

The embodiments illustrated herein describe a decompression panel assembly having a solid face panel that is retained against a frame during standard operating conditions and that moves away from the frame during a decompression event. In one implementation, the decompression panel assembly includes a frame having a first surface and an opposing second surface, wherein the frame defines a grille opening and at least partially defines a flow path opening. The decompression panel also includes a face panel having a first surface retained against the frame second surface such that the face panel at least partially covers the grille opening and a retention mechanism coupled to the face panel and configured to retain the face panel against the frame in a closed position. The decompression panel assembly also includes a containment device positioned adjacent a second surface of the face panel and configured to contain the face panel when the face panel is in an open position.

In another implementation, the decompression panel assembly includes a frame having a first surface and an opposing second surface, wherein the frame defines a grille opening and at least partially defines a flow path. The decompression panel assembly also includes a first panel and a second panel pivotally coupled together at a central hinge and a retention plate releasably coupled to the first and second panels and configured to move between a closed position and an open position. The first and second panels at least partially cover the grille opening in a planar position when the retention plate is in the closed position, and the first and second panels move away from the grille opening to a folded position when the retention plate is in the open position.

The decompression panel assembly implementations described herein have a number of advantages over conventional decompression panel assemblies. For example, the decompression panel assembly implementations described herein include a face panel that is positively retained against a frame of the assembly by either a plurality of retention mechanisms or by a retention plate. The positive retention devices both enable the face panel to move away from the frame to allow airflow through a grille opening during a decompression event. As described herein, the face panel is a solid member that completely covers the grille opening during standard operation and may not allow for any undesired air to pass through or for flapping or resonating of the face panel itself. As such, less noise is transmitted into the cabin. Additionally, described herein are a number of flow path openings to allow return air to flow through the decompression panel assembly during standard operation. The flow path openings described herein define a tortuous path around the frame that further attenuate noise transmitted into the cabin.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A decompression panel assembly for use in an aircraft, said decompression panel assembly comprising:
    a frame comprising a first surface and an opposing second surface, wherein said frame defines a grille opening and at least partially defines a flow path opening that are each defined between said first and said second surfaces;
    a first panel and a second panel pivotally coupled together at a central hinge; and
    a retention plate releasably coupled to said first and said second panels and configured to move between a closed position and an open position, wherein said first and said second panels at least partially cover the grille opening in a planar position when said retention plate is in the closed position, and wherein said first and said second panels move away from the grille opening to a folded position when said retention plate is in the open position.

2. The decompression panel assembly in accordance with claim 1, further comprising a top hinge coupled to said frame and to said first panel, wherein said top hinge is configured to enable movement of said first panel between the planar position and the folded position.

3. The decompression panel assembly in accordance with claim 1, wherein said retention plate comprises a first side proximate said first and said second panels and an opposing second side.

4. The decompression panel assembly in accordance with claim 3, wherein said first side is releasably coupled to said first and said second panels at said central hinge such that said first side biases said first and said second panels in the planar position when said retention plate is in the closed position.

5. The decompression panel assembly in accordance with claim 3, further comprising a pivot bar pivotally coupled to said retention plate second side.

6. The decompression panel assembly in accordance with claim 1, wherein said retention plate is configured to allow said first and said second panels to move from the planar position to the folded position when said first and said second panels are subjected to a predetermined pressure differential.

7. The decompression panel assembly in accordance with claim 1, wherein said central hinge biases said first and said second panels in the folded position when said retention plate is in the open position.

8. The decompression panel assembly in accordance with claim 1, wherein said frame comprises a channel configured to retain a bottom edge of said second panel.

9. The decompression panel assembly in accordance with claim 1, wherein the flow path opening comprises a plurality of openings defined in said frame.

10. The decompression panel assembly in accordance with claim 1, further comprising a grille member coupled to said frame such that said grille member spans said grille opening, wherein the flow path opening is defined between said frame and said grille member.

11. The decompression panel assembly in accordance with claim 1, further comprising a body panel coupled to said frame, wherein the flow path opening comprises a plurality of openings defined in said body panel.

12. A method of installing a decompression panel assembly in an aircraft, the decompression panel assembly including a frame, a first panel, a second panel, and a retention plate, said method comprising:
pivotally coupling the first panel to the frame at a first hinge, wherein the frame defines a grille opening and at least partially defines a flow path opening;
pivotally coupling the first panel to the second panel at a second hinge; and
releasably coupling the retention plate to the first and the second panels, wherein the retention panel is configured to move between a closed position and an open position, wherein said first and said second panels at least partially cover the grille opening in a planar position when said retention plate is in the closed position, and wherein said first and said second panels move away from the grille opening to a folded position when said retention plate is in the open position.

13. The method in accordance with claim 12, wherein pivotally coupling the first panel to the frame at a first hinge comprises pivotally coupling the first panel to the frame at a first hinge such that the first hinge is configured to enable movement of said first panel between the planar position and the folded position.

14. The method in accordance with claim 12, wherein releasably coupling the retention panel to the first and the second panels comprises releasably coupling a first side of the retention panel to the first and the second panels at the second hinge such that said first side biases said first and said second panels in the planar position when said retention plate is in the closed position.

15. The method in accordance with claim 12, further comprising pivotally coupling a second side of the retention plate to a pivot bar.

16. The method in accordance with claim 12, wherein pivotally coupling the first panel to the second panel at a second hinge comprises pivotally coupling the first panel to the second panel at a second hinge such that the second hinge biases said first and said second panels in the folded position when said retention plate is in the open position.

17. The method in accordance with claim 12, wherein releasably coupling the retention panel to the first and the second panels comprises releasably coupling the retention panel such that the retention plate is configured to allow the first and the second panel to move from the planar position to the folded position when the first and the second panels are subjected to a predetermined pressure differential.

18. The method in accordance with claim 12, further comprising coupling a grille member to the frame such that the grille member spans the grille opening, wherein the flow path opening is defined between the frame and the grille member.

19. An aircraft comprising:
a sidewall assembly comprising:
a sidewall; and
a decompression panel assembly coupled to said sidewall, wherein said decompression panel assembly comprises:
a frame comprising a first surface and an opposing second surface, wherein said frame defines a grille opening and at least partially defines a flow path opening that are each defined between said first and said second surfaces;
a first panel and a second panel pivotally coupled together at a central hinge; and
a retention plate releasably coupled to said first and said second panels and configured to move between a closed position and an open position, wherein said first and said second panels at least partially cover the grille opening in a planar position when said retention plate is in the closed position, and wherein said first and said second panels move away from the grille opening to a folded position when said retention plate is in the open position.

20. The aircraft in accordance with claim 19, wherein said retention plate is releasably coupled to said first and said second panels at said central hinge such that said retention plate biases said first and said second panels in the planar position when said retention plate is in the closed position, wherein said central hinge biases said first and said second panels in a folded position when said retention plate is in the open position, and wherein said retention plate is configured to allow said first and said second panels to move from the planar position to the folded position when said first and said second panels are subjected to a predetermined pressure differential.

* * * * *